(12) United States Patent
McIntyre

(10) Patent No.: US 10,415,836 B2
(45) Date of Patent: Sep. 17, 2019

(54) COOKING APPARATUS AND AIR DELIVERY AND CIRCULATION DEVICE THEREFORE

(71) Applicant: Michael James McIntyre, Navan (IE)

(72) Inventor: Michael James McIntyre, Navan (IE)

( * ) Notice: Subject to any disclaimer, the term of this patent is extended or adjusted under 35 U.S.C. 154(b) by 603 days.

(21) Appl. No.: 15/017,600

(22) Filed: Feb. 6, 2016

(65) Prior Publication Data

US 2016/0231003 A1    Aug. 11, 2016

(30) Foreign Application Priority Data

Feb. 6, 2015    (IE) .................................. S2015/0030

(51) Int. Cl.
| | |
|---|---|
| *F24C 15/32* | (2006.01) |
| *A21B 1/02* | (2006.01) |
| *A21B 1/26* | (2006.01) |
| *H05B 6/64* | (2006.01) |
| *F24C 15/18* | (2006.01) |

(52) U.S. Cl.
CPC .............. *F24C 15/32* (2013.01); *A21B 1/02* (2013.01); *A21B 1/26* (2013.01); *F24C 15/18* (2013.01); *F24C 15/322* (2013.01); *F24C 15/325* (2013.01); *H05B 6/6473* (2013.01)

(58) Field of Classification Search
CPC ........ F24C 15/32; F24C 15/322; A01F 12/48; F26B 3/02; F26B 17/1416; F26B 21/004; A21B 1/24; A21B 1/26
See application file for complete search history.

(56) References Cited

U.S. PATENT DOCUMENTS

| | | | | |
|---|---|---|---|---|
| 3,458,686 A | * | 7/1969 | Gvozdjak | ................ A21B 1/26 126/21 R |
| 3,605,717 A | * | 9/1971 | Sauer | ....................... A21B 1/26 126/21 A |

(Continued)

FOREIGN PATENT DOCUMENTS

| | | |
|---|---|---|
| DE | 259592 C | 5/1913 |
| EP | 1045208 A2 | 10/2000 |

(Continued)

OTHER PUBLICATIONS

M. Tamai, Z. Wang, G. Rajagopalan, H. Hu, & G. He, "Aerodynamic Performance of a Corrugated Dragonfly Airfoil Compared with Smooth Airfoils at Low Reynolds Numbers", American Institute of Aeronautics and Astronautics, 2007.*

(Continued)

*Primary Examiner* — Gregory A Wilson
(74) *Attorney, Agent, or Firm* — LaMorte & Associates, P.C.

(57) ABSTRACT

An air delivery and circulation device for a cooking apparatus comprising a duct member mountable in a cooking chamber of the cooking apparatus, the duct member comprising an airflow inlet for receiving heated air and at least one opening into the cooking chamber, in which the duct member is operable to channel the heated air from the airflow inlet to the opening. An aerofoil shaped extension member projects externally from the duct member at or adjacent to each opening and is operable to direct streams of heated air from the opening into the cooking chamber to thereby heat or cook a food product in the cooking chamber.

16 Claims, 7 Drawing Sheets

(56) References Cited

U.S. PATENT DOCUMENTS

| | | | | |
|---|---|---|---|---|
| 3,861,378 A * | 1/1975 | Rhoads | A21B 1/26 | 126/21 A |
| 4,185,611 A * | 1/1980 | Johnson | F24B 1/182 | 126/506 |
| 4,202,259 A * | 5/1980 | Johansson | A21B 1/26 | 126/20 |
| 4,269,169 A * | 5/1981 | Guibert | A23L 3/362 | 126/21 A |
| 4,287,870 A * | 9/1981 | Johnson | F24B 1/182 | 126/163 R |
| 4,326,497 A * | 4/1982 | Guibert | A23L 3/365 | 126/261 |
| 4,386,558 A * | 6/1983 | Holman | A47J 37/044 | 126/21 A |
| 4,465,701 A * | 8/1984 | Holman | A47J 37/044 | 426/520 |
| 4,534,987 A * | 8/1985 | Holman | A47J 37/044 | 426/520 |
| 4,829,158 A * | 5/1989 | Burnham | F24C 15/325 | 126/21 A |
| 5,025,775 A | 6/1991 | Crisp | | |
| 5,172,682 A * | 12/1992 | Luebke | A21B 1/245 | 126/21 A |
| 5,203,315 A * | 4/1993 | Clawson | F24C 3/087 | 126/19 R |
| 5,529,052 A * | 6/1996 | Sanchez | A21B 1/26 | 126/21 A |
| 5,732,614 A * | 3/1998 | Oslin | A21B 1/26 | 126/20 |
| 5,964,044 A * | 10/1999 | Lauersdorf | A21B 1/245 | 126/21 A |
| 5,968,578 A * | 10/1999 | Knisely | F25D 13/067 | 165/120 |
| 6,146,678 A * | 11/2000 | Caridis | A21B 1/245 | 426/510 |
| 6,776,611 B1 * | 8/2004 | Sprague | D01F 9/32 | 432/242 |
| 7,087,872 B1 * | 8/2006 | Dobie | F24C 15/166 | 219/401 |
| 7,193,184 B1 * | 3/2007 | Manning | A21B 1/245 | 219/388 |
| 7,264,467 B1 * | 9/2007 | Mitchell | F27B 17/0016 | 34/270 |
| 7,621,285 B2 * | 11/2009 | Robert | B08B 3/022 | 134/61 |
| 8,006,685 B2 * | 8/2011 | Bolton | A47J 37/0641 | 126/19 R |
| 8,042,533 B2 * | 10/2011 | Dobie | A21B 1/245 | 126/19 R |
| 8,528,232 B1 * | 9/2013 | Ennis | F26B 21/004 | 134/12 |
| 8,991,383 B2 * | 3/2015 | Johnson | F24C 15/16 | 126/21 A |
| 2003/0056658 A1 * | 3/2003 | Jones | A21B 1/245 | 99/386 |
| 2004/0177769 A1 * | 9/2004 | Kobayashi | A21B 1/245 | 99/360 |
| 2005/0039613 A1 * | 2/2005 | Kaminaka | F24C 15/2014 | 99/476 |
| 2005/0109760 A1 * | 5/2005 | Tatsumu | F24C 15/325 | 219/399 |
| 2006/0027560 A1 | 2/2006 | Song et al. | | |
| 2006/0169686 A1 * | 8/2006 | Andoh | A21B 3/04 | 219/401 |
| 2006/0272632 A1 * | 12/2006 | Duncan | F24C 15/325 | 126/273 R |
| 2007/0039338 A1 * | 2/2007 | Perry | F24F 11/70 | 62/178 |
| 2007/0056612 A1 * | 3/2007 | Robert | B08B 3/022 | 134/61 |
| 2007/0137633 A1 * | 6/2007 | McFadden | A21B 1/245 | 126/21 A |
| 2007/0295322 A1 * | 12/2007 | Dobie | A21B 1/245 | 126/21 A |
| 2008/0105136 A1 * | 5/2008 | McFadden | A21B 1/245 | 99/339 |
| 2008/0206420 A1 * | 8/2008 | McFadden | A21B 1/245 | 426/523 |
| 2008/0216338 A1 * | 9/2008 | Doyle | F26B 21/004 | 34/60 |
| 2008/0311842 A1 * | 12/2008 | Alston | F24F 13/10 | 454/361 |
| 2009/0038481 A1 * | 2/2009 | Yamamoto | A21B 3/04 | 99/330 |
| 2009/0090347 A1 * | 4/2009 | Kim | F24C 7/082 | 126/21 A |
| 2009/0095727 A1 * | 4/2009 | Majchrzak | A47J 39/003 | 219/385 |
| 2009/0139976 A1 * | 6/2009 | Lee | A21B 1/245 | 219/400 |
| 2009/0178575 A1 * | 7/2009 | Baker | A21B 1/245 | 99/401 |
| 2010/0000509 A1 * | 1/2010 | Babington | A21B 1/26 | 126/19 R |
| 2010/0058936 A1 * | 3/2010 | Schjerven, Sr. | A21B 1/245 | 99/443 C |
| 2010/0120350 A1 * | 5/2010 | Pucciani | F26B 21/004 | 454/188 |
| 2010/0146811 A1 * | 6/2010 | Steffens | D06F 58/22 | 34/480 |
| 2011/0126819 A1 * | 6/2011 | Yoshimura | F24C 15/16 | 126/21 A |
| 2011/0139140 A1 * | 6/2011 | Baker | A21B 1/245 | 126/1 AD |
| 2011/0214661 A1 * | 9/2011 | Hyun | F24C 15/006 | 126/21 A |
| 2012/0273070 A1 * | 11/2012 | Freers | F26B 21/004 | 137/565.01 |
| 2013/0036918 A1 * | 2/2013 | Sakane | F24C 15/322 | 99/358 |
| 2013/0059261 A1 * | 3/2013 | Sprague | F27B 9/28 | 432/64 |
| 2013/0247605 A1 * | 9/2013 | Laudet | B60H 1/00378 | 62/239 |
| 2013/0284161 A1 * | 10/2013 | Johnson | F24C 15/325 | 126/21 A |
| 2013/0291854 A1 * | 11/2013 | Johnson | F24C 15/16 | 126/21 A |
| 2013/0308678 A1 * | 11/2013 | Bach | G01K 13/02 | 374/142 |
| 2014/0202444 A1 * | 7/2014 | Dobie | F24C 15/322 | 126/21 A |
| 2014/0223759 A1 * | 8/2014 | Gougoulas | F26B 5/00 | 34/90 |
| 2015/0075373 A1 * | 3/2015 | Miller | F24F 3/1603 | 95/15 |
| 2015/0181857 A1 * | 7/2015 | Mladek | A01M 1/2094 | 43/132.1 |
| 2015/0192307 A1 * | 7/2015 | Paller | F24C 15/322 | 126/273 R |
| 2015/0330642 A1 * | 11/2015 | Vasan | F24C 15/32 | 219/400 |
| 2015/0343476 A1 * | 12/2015 | McFadden | B05B 16/60 | 454/52 |
| 2015/0359047 A1 * | 12/2015 | Kishimoto | H05B 6/6447 | 219/704 |
| 2016/0091242 A1 * | 3/2016 | Santos | F25D 23/12 | 62/66 |
| 2016/0201924 A1 * | 7/2016 | Deng | B23P 19/00 | 126/21 A |
| 2016/0215989 A1 * | 7/2016 | Buller-Colthurst | A21B 1/26 | |
| 2016/0330801 A1 * | 11/2016 | Hayashi | F24C 15/325 | |
| 2016/0370029 A1 * | 12/2016 | Kurelowech | F24F 12/006 | |
| 2017/0130964 A1 * | 5/2017 | Vasan | F24C 3/124 | |
| 2018/0070783 A1 * | 3/2018 | Sawabe | A47K 10/48 | |
| 2018/0171461 A1 * | 6/2018 | Jee et al. | C23C 2/18 | |
| 2018/0214916 A1 * | 8/2018 | Fukurotani | B23Q 11/005 | |

(56) References Cited

U.S. PATENT DOCUMENTS

FOREIGN PATENT DOCUMENTS

| EP | 2060854 A1 | 5/2009 | | |
|---|---|---|---|---|
| EP | 2607797 A2 | 6/2013 | | |
| WO | WO 9639790 A1 | * | 12/1996 | ............. G07F 9/105 |

OTHER PUBLICATIONS

Salahuddin Ahmed, "Computation of turbulent flow about unconventional airfoil shapes", Iowa State University, 1990.*
F.M. White, "Fluid Mechanics", 7th Edition, 2011.*

* cited by examiner

COOKING APPARATUS AND AIR DELIVERY AND CIRCULATION DEVICE THEREFORE

RELATED APPLICATIONS

This application claims priority of Irish Short-Term Patent Application No. S2015/0030 filed on 6 Feb. 2015.

BACKGROUND OF THE INVENTION

1. Field of the Invention

The present invention relates to a cooking apparatus and an air delivery and circulation device for a cooking apparatus.

2. Prior Art Description

Various types of ovens for cooking food items are known to circulate a turbulent or irregular airflow through a cooking chamber to heat or cook a food item. However, non-uniform surface browning of food items cooked by these ovens is typical, and localised hot or burn spots frequently occur due to changes in the slope and flow direction of the airflow within the cooking chamber.

A further problem that exists is that these ovens are inefficient due to the manner in which heated air used to cook a food item is reheated and recirculated within the cooking chamber of the cooking apparatus.

It is therefore an object of the present invention to provide an air circulation and delivery device for a cooking apparatus which goes some way towards overcoming the above problems and/or provides the public and/or industry with a useful alternative.

Further aspects of the present invention will become apparent from the ensuing description which is given by way of example only.

According to one embodiment the present invention provides an air delivery and circulation device for a cooking apparatus comprising:

a duct member mountable in a cooking chamber of the cooking apparatus, the duct member comprising an airflow inlet for receiving heated air and at least one opening into the cooking chamber, in which the duct member operable to channel the heated air from the airflow inlet to the opening, and an aerofoil shaped extension member projects externally from the duct member at or adjacent to each opening, and whereby the aerofoil shaped extension member is operable to direct streams of heated air from the opening into the cooking chamber to thereby heat or cook a food product in the cooking chamber.

Preferably, the aerofoil shaped extension member comprises a pair of spaced apart extension member wings which project into the cooking chamber at or adjacent to each opening.

Preferably, each extension member wing is configured as a plate member formed from one or more of: metal, polymer, ceramic, glass or other material configured to withstand high heat up to temperatures of about between 400 to 500 degrees Celsius.

Preferably, each opening of the duct member is provided as a slot having an elongate top edge and an elongate bottom edge spaced apart by a pair of side edges, and one of the pair of extension member wings is provided at or adjacent the top edge of the slot, and the other of the pair of extension member wings is provided at or adjacent to the bottom edge of the slot, in which heated air flows out of an opening between the extension member wings.

Preferably, each extension member wing comprises a top surface and a bottom surface, and the top surface of each extension member wing is profiled with an aerofoil shape such that the top surfaces of the pair of extension member wings when arranged at or adjacent an opening together define a substantially arc-like or curve-like profiled surface.

Preferably, the aerofoil shaped extension member is integrally formed with the duct member. Alternatively, the aerofoil shaped extension member is connectable to the duct member.

Preferably, the duct member comprises a plurality of openings and an aerofoil shaped extension member extends into the cooking chamber at or adjacent to each opening.

Preferably, the air delivery and circulation device comprises connection means for connecting the airflow inlet of the duct member to an outlet of an air heating chamber of the cooking apparatus.

Preferably, the air delivery and circulation device comprises connection means for connecting the airflow inlet of the duct member to an outlet of an air recirculation chamber of the cooking apparatus.

Preferably, the air delivery and circulation device comprises connection means for connecting the airflow inlet of the duct member to an outlet of an air heating chamber and air recirculation chamber of the cooking apparatus such that heated air from the air heating chamber and air recirculation chamber are combined at the airflow inlet of the duct member.

Preferably, the duct member is mountable to baffle means provided between an air heating chamber and the cooking chamber of the cooking apparatus.

Preferably, the duct member is mounted slightly below a ceiling surface of the cooking apparatus.

Preferably, the duct member comprises an arrangement of interconnected or integrally formed tube members, the tube members extending into the cooking chamber in the direction of flow of air through the duct member.

Preferably, the duct member comprises a pair of side tube members that extend substantially perpendicularly to baffle means of the cooking apparatus.

Preferably, the side tube members are spaced apart in the cooking chamber by one or more cross tube members that extend substantially perpendicular between the side tube members. The cross tube members that extend substantially perpendicular between the side tube members act as a balancing mechanism, by way of restrictive means, to substantially equalise the pressure and airflow of through/within each tube member.

Preferably, the duct member comprises one or more regions of converging or reducing cross-sectional internal diameter.

Preferably, a metering valve is disposed in one of or in each of: the side tube members and the cross tube member.

According to a further aspect of the present invention there is provided a cooking apparatus comprising:

a cooking chamber for cooking a food product therein;

an air heating chamber;

baffle means for separating the cooking chamber and the air heating chamber, and an airflow delivery and circulation device comprising a duct member in the cooking chamber, the duct member comprising at least one opening into the cooking chamber and an airflow inlet for receiving heated air from the air heating chamber, in which the duct member is operable to channel the heated air from the airflow inlet to the opening, and an aerofoil shaped extension member projects externally from the duct member into the cooking chamber at or adjacent to each opening, and whereby the aerofoil shaped extension member is operable to direct streams of heated air from the opening into the cooking chamber to heat or cook a food product in the cooking chamber.

According to a still further aspect of the present invention there is provided a cooking apparatus comprising:
  a cooking chamber for cooking a food product therein;
  an air recirculation chamber,
  baffle means for separating the cooking chamber and the air recirculation chamber; and
  an airflow delivery and circulation device comprising a duct member is mounted in the cooking chamber,
  the duct member comprising at least one opening into the cooking chamber and an airflow inlet for receiving heated air from the air recirculation chamber, in which the duct member is operable to channel the heated air from the airflow inlet to the opening, and
  an aerofoil shaped extension member projects externally from the duct member into the cooking chamber at or adjacent to each opening, and whereby the aerofoil shaped extension member is operable to direct streams of heated air from the opening into the cooking chamber to heat or cook a food product in the cooking chamber.

According to a still further aspect there is provided a cooking apparatus comprising:
  a cooking chamber for cooking a food product therein;
  an air heating chamber;
  an air recirculation chamber, and
  an airflow delivery and circulation device comprising a duct member mounted in the cooking chamber,
  the duct member comprising at least one opening into the cooking chamber and an airflow inlet for receiving heated air from both of the air heating chamber and the air recirculation chamber, and in which the duct member is operable to channel the combined heated air from the air heating chamber and the air recirculation chamber from the airflow inlet to the opening, and
  an aerofoil shaped extension member projects externally from the duct member at or adjacent to each opening, and whereby the aerofoil shaped extension member is operable to direct streams of heated air from the opening into the cooking chamber to heat or cook a food product in the cooking chamber.

The present invention provides an air delivery and circulation device for a cooking apparatus, such as an oven, toaster or other cooking device used for heating or cooking a food product. The present invention comprises a duct member or tubing, and an aerofoil shaped extension member that projects externally from the duct member at or adjacent to each opening thereof for the delivery of heated air into a cooking chamber of the cooking apparatus. It will be understood that the cooking apparatus of the present invention also includes conventional means for radiant convection cooking including one or more fan-assisted convection elements and/or one or more quartz heating elements.

The present invention ensures that heated air travels smoothly in regular paths through the duct member and exits via the aerofoil shaped extension member, which operates to deliver heated air into the cooking chamber of the cooking apparatus. The resultant laminar flow or streamline flow ensures that the velocity, pressure, and other flow properties of the air at each point in the cooking chamber remains relatively constant.

Laminar air flow over the aerofoil shaped extension member further causes a decrease in pressure consisting of thin parallel layers or laminae of air. The air in contact with the top surface of the aerofoil shaped extension members is substantially stationary, but other layers of heated air slide over each other thus bringing air from the top and sides of the cooking apparatus (using the differential pressure that is created) creating a recirculation effect inside the cooking apparatus. The present invention provides a self-perpetuating re-circulated airflow that provides consistent results in terms of browning when cooking a food item for minimum energy input.

The present invention further provides a cooking apparatus with an air heating chamber, an air circulation device and a baffle plate which cooperate to extract maximum energy from the airflow for a given input power.

The duct member circulates the airflow into and around the cavity, expelling airflow over the aerofoil shapes to deliver a laminar airflow with a substantially constant pressure and velocity. By recirculating air back to the duct member over a reflector provided in the recirculation chamber housing quartz heating tubes provides further energy efficiency as excess energy is absorbed from the reflectors into the recirculated air. Such absorption improves the efficiency of the reflectors and the quartz tubes and ensures that they are maintained at a constant temperature, which extends the working life of the tubes.

The provision of filtration means at the inlet port of the air re-circulation chamber is advantageous, and further extends the working life of the quartz tubes. Airflow over the reflectors is provided by a venturi effect, not a dedicated motor and fan, which contributes to a further energy efficiency.

Recirculating the heated air from the inside of the cooking chamber by establishing differential pressure inside the cooking chamber by use of the aerofoil shapes and not high powered fans, contributes to a further energy efficiency. The retention of moisture in the product and cooking chamber improves the quality of cooking process and the resultant cooked product. Using software to control the cooking process by measuring power draw at each stage and the cycling of power to heating elements, quartz tubes and adjusting time accordingly, contributes to a further energy efficiency and improvement in the cooking process.

DETAILED DESCRIPTION OF THE DRAWINGS

The invention will be more clearly understood from the following description of some embodiments thereof, given by way of example only, with reference to the accompanying drawings, in which.

DETAILED DESCRIPTION OF THE DRAWINGS

Figure 1:
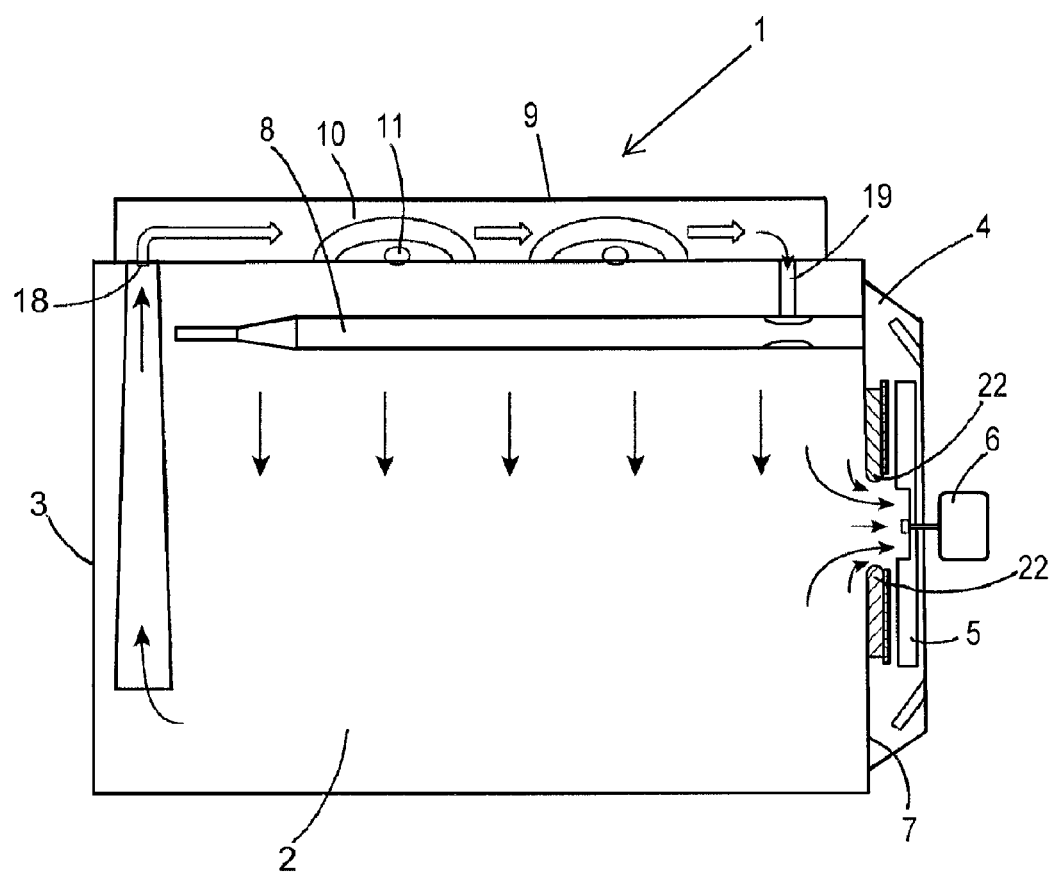
FIG. 1 is a diagrammatic of a cooking apparatus incorporating an air delivery and circulation device according to the invention.

Referring to the drawings, and initially to FIG. 1, there is shown a cooking apparatus 1 for cooking a food item. The cooking apparatus 1 comprises a cooking chamber 2 into which is placed a food item to be cooked, and the cooking chamber 2 is closable by a door 3. The cooking apparatus 1 includes an air heating chamber 4 for supplying heated air into the cooking chamber 2. The air heating chamber 4 houses an impeller fan 5 which is driven by a motor 6 and a heating element 26 for heating air drawn into the heating chamber 4 by the impeller fan 5. A baffle means or baffle plate 7 is provided for separating the cooking chamber 2 and the air heating chamber 4. An air re-circulation chamber 9 is provided in the upper region of the cooking chamber 2 and comprises quartz heating tubes 11 housed in reflectors 10 which radiate heat into the cooking chamber 2. The quartz tubes reflectors 11 are maintained at the cooking chamber pre-set temperature and heat up to a temperature in the range of about 300-500 degrees Celsius when activated. An inlet port 18 channels air from the cooking chamber 2 back to the air re-circulation chamber 9.

Also shown is a duct member 8 of an air delivery and circulation device according to the invention, which will be further described with reference to FIGS. 2 to 11. The cooking chamber 2, the air heating chamber 4, the air re-circulation chamber 9 and the duct member 8 are contained in a housing 20 of the cooking apparatus 1.

Figure 2:
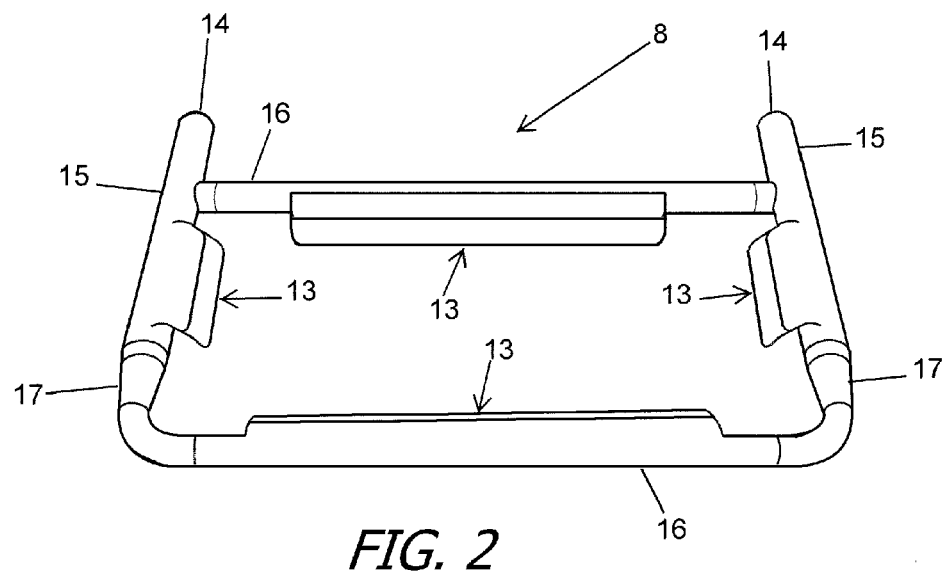
FIG. 2 is perspective view from above of a duct member of the air delivery and circulation device according to the invention.
Figure 3:
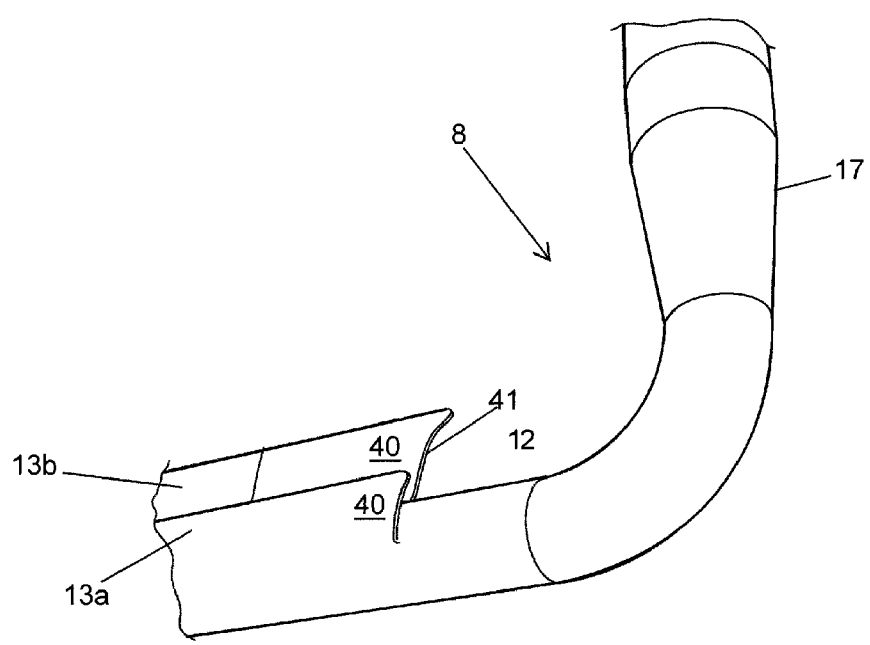
FIG. 3 is a perspective view from above of a section of the duct member shown in FIG. 2.
Figure 4:
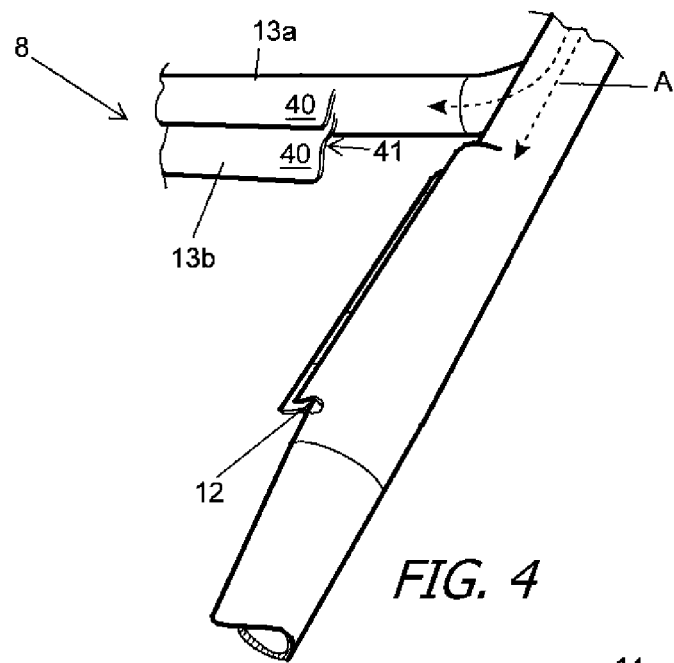
FIG. 4 is a perspective view from above of a further section of the duct member shown in FIG. 2.
Figure 5:
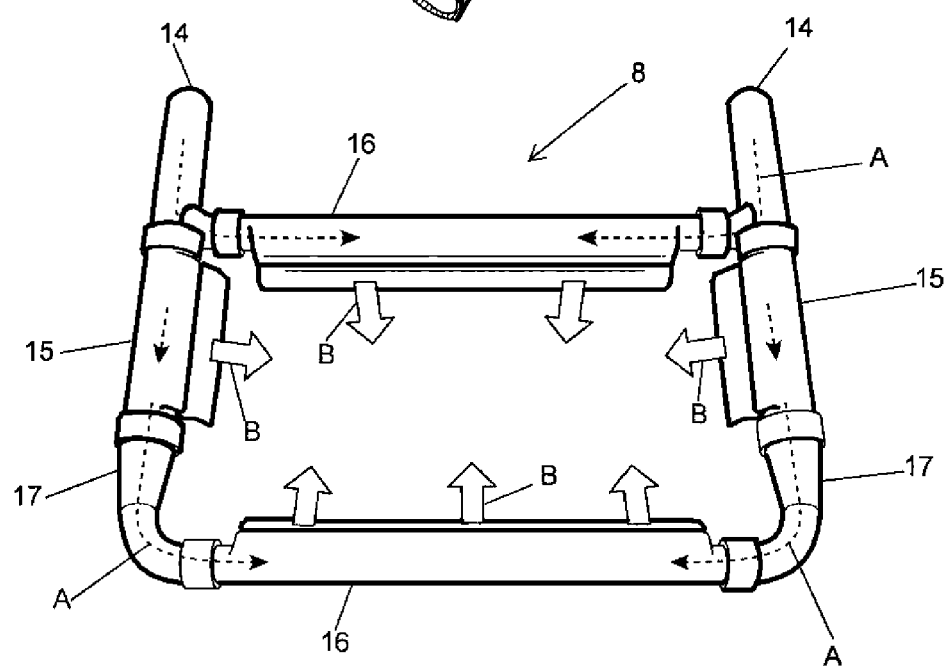
FIG. 5 is a perspective view from above showing air flow through the duct member of FIG. 2.
Figure 6:
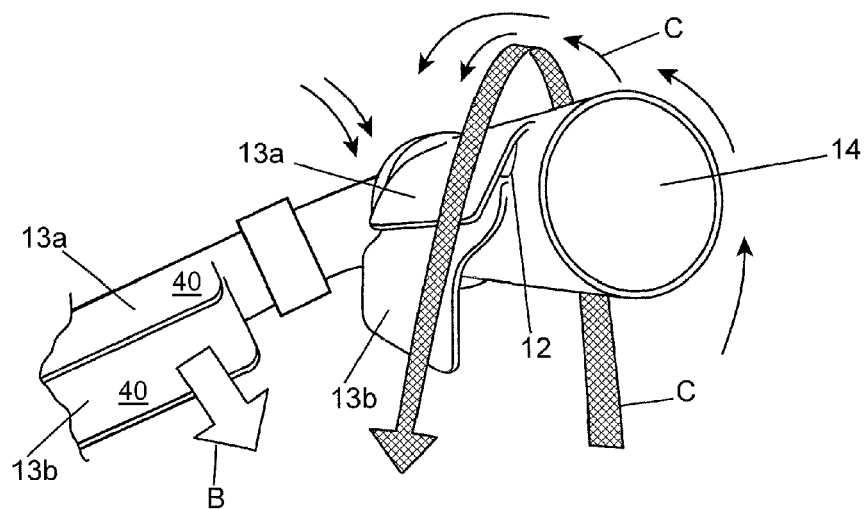
FIG. 6 is an end view of the of the duct member of FIG. 2 showing air flow over a section thereof.
Figure 7:
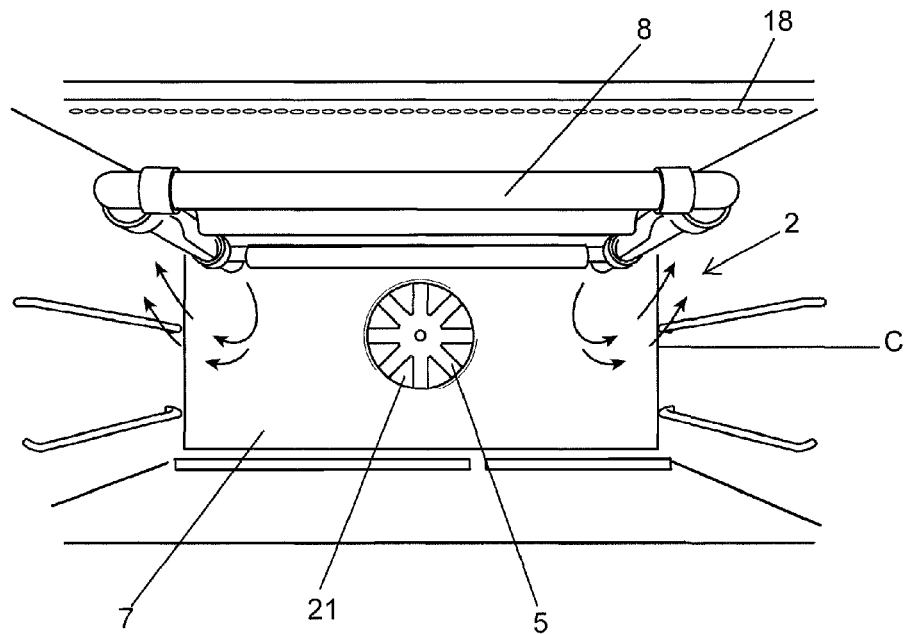
FIG. 7 is a front view showing a cooking chamber of a cooking apparatus in which is mounted the duct member shown in FIG. 2.

As shown in FIGS. 2 to 4, the duct member 8 comprises an airflow inlet port 14 for receiving heated air and a number of openings 12 which face into the cooking chamber 2. The duct member 8 is operable to channel the heated air from the airflow inlet 14 to the openings 12. The duct member 8 will be understood to be an arrangement of interconnected or integrally formed conduits or tubes providing a passageway for the transfer of a heated fluid, such as heated air, from the air heating chamber 4 via the duct member 8 and out of the openings 12 into the cooking chamber 2 to cook a food item placed therein.

The duct member 8 comprises an aerofoil shaped extension member, indicated generally by the reference numeral 13, that projects externally from the duct member 8 at or adjacent to each opening 12. The aerofoil shaped extension member 13 provided at each slot opening 12 is operable to deliver and to direct streams of heated air from the opening 12 into the cooking chamber 2 to thereby heat or cook a food product in the cooking chamber.

As shown, each aerofoil shaped extension member 13 comprises a pair of spaced apart aerofoil extension member wings 13a, 13b which project into the cooking chamber 2 at or adjacent to each opening 12. In the instance shown, each extension member wing 13a, 13b is configured as a plate member formed from one or more of: metal, polymer, ceramic, glass or other material configured to withstand high heat. Each extension member wing also comprises a top surface 40 having an aerofoil profile and a bottom surface 41, and the top surfaces 40 of the pair of extension member wings when arranged at each opening 12 together define a substantially arc-like or curve-like profiled surface.

Each opening 12 provided on the duct member 8 is formed a slot having an elongate top edge and an elongate bottom edge spaced apart by a pair of side edges, in which one of the pair of extension member wings 13a is provided at or adjacent the top edge of the slot 12, and the other of the pair of extension member wings 13b is provided at or adjacent to the bottom edge of the slot 12. Heated air thus flows out of each opening slot 12 between the extension member wings 13a, 13b. The slots may optimally have a height of the order of about 1 mm to 5 mm, and preferably 2 mm, based on cooking chamber volume and airflow requirements.

The inlet port 14 of the duct member 8 is provided by the open ends of the duct member 8, each of which is connected to the baffle means 7 of the cooking apparatus 1 to provide a passage for heated air to pass through.

In the instance shown, the duct member 8 comprises a pair of side tube members 15 spaced apart and in communication with a pair of cross tube members 16. It will be understood that the side tube members 15 and cross tube members 16 extend in the direction of flow of air through the duct member, such airflow indicated by the dotted arrows 'A'. In use, the side tube members 15 extend substantially perpendicularly to the baffle means 7, and the cross tube members 16 extend substantially parallel to the baffle means 7.

The duct member 8 comprises convergent regions or ducts 17 in which the side tube members 15 and/or the cross tube members 17 have a tapered section merging to form a reduced cross-sectional diameter. A metering valve may optionally be disposed in one of or in each of: the side tube members and the cross tube member to regulate and/or monitor air flow through the duct member 8.

Figure 8:
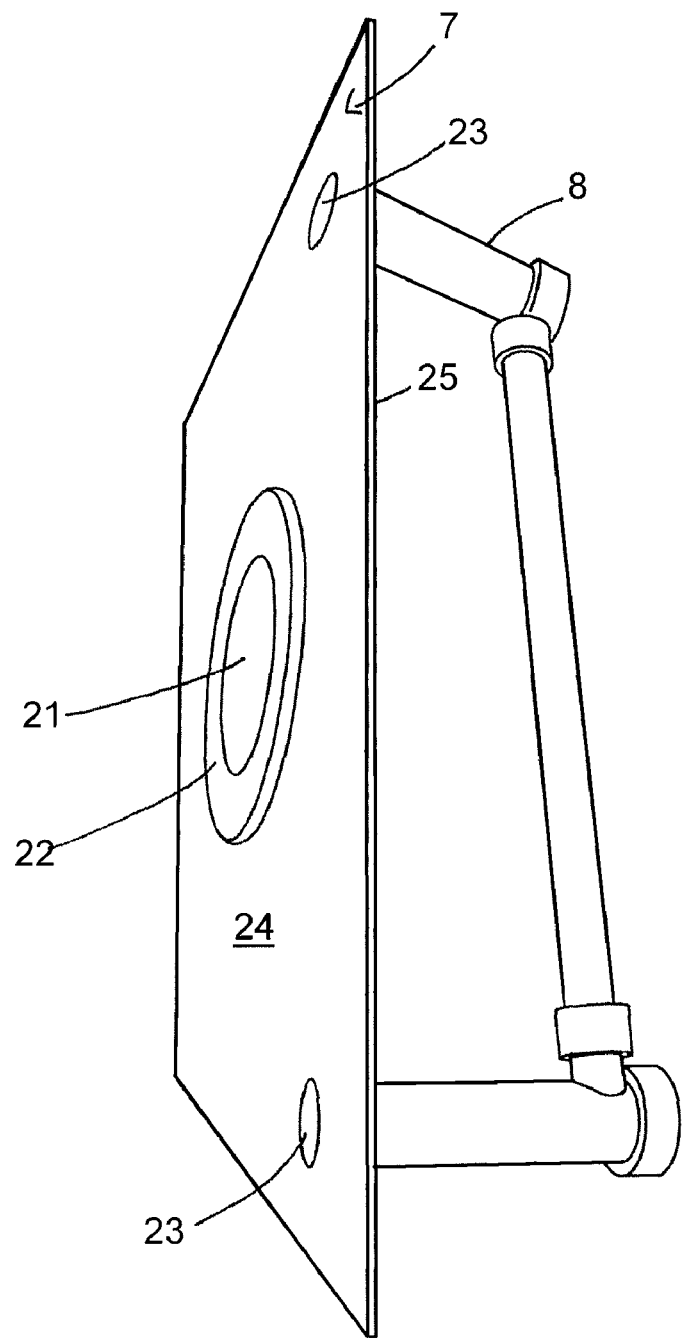
FIG. 8 is a perspective view of a baffle plate according to the invention.

FIG. 8 shows the baffle means 7 of a cooking apparatus in further detail. The baffle means 7 is positioned between the cooking chamber 2 and the air heating chamber 4. The baffle means 7 may be formed as a plate comprising an air intake opening 21 disposed therein through which air is drawn from the cooking chamber 2 into the air heating chamber 4 by the centrifugal impeller fan 5. The air intake opening 21 of the baffle means 7 comprises a rounded or defined curved edge 22 on the air heating chamber side 24 and also the cooking chamber facing side 25 to improve the efficiency. Also provided are air outlet ports 23 which are provided as openings in the plate 7 through which heated air is channelled to the cooking chamber 2. More specifically, the inlet ports or open ends 14 of the duct member 8 are coupled to the ports 23 to enable the transmission of heated air from the air heating chamber 4 to the cooking chamber 2.

Figure 9:
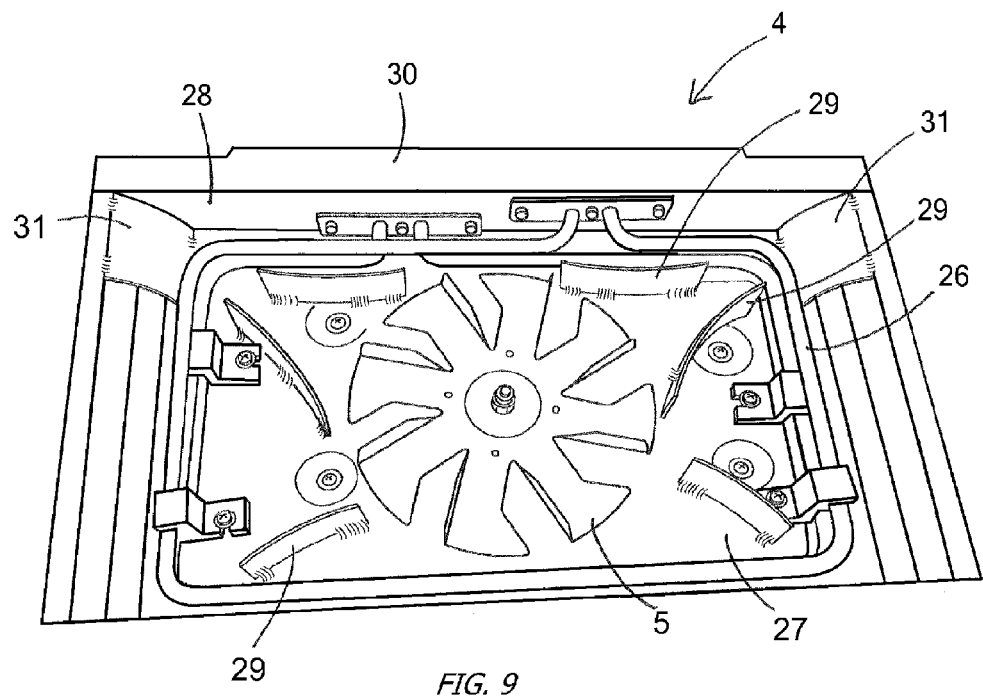
FIG. 9 is a diagrammatic of an air heating chamber for a cooking apparatus according to the invention.
Figure 10:
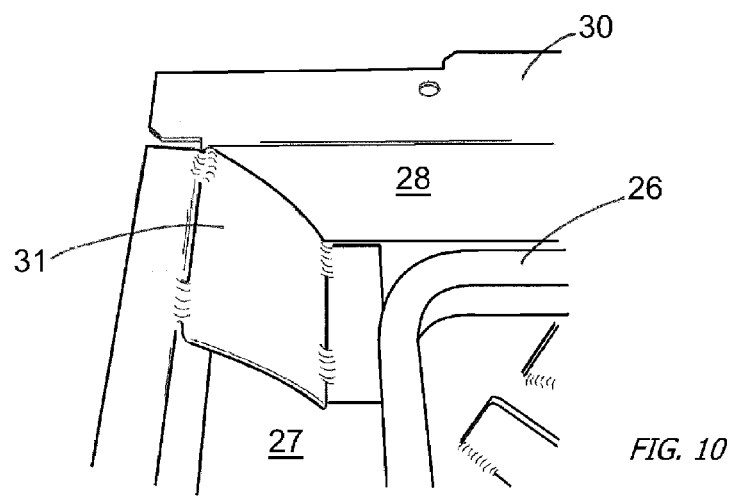
FIG. 10 is a diagrammatic of a section of the air heating chamber shown in FIG. 9.
Figure 11:
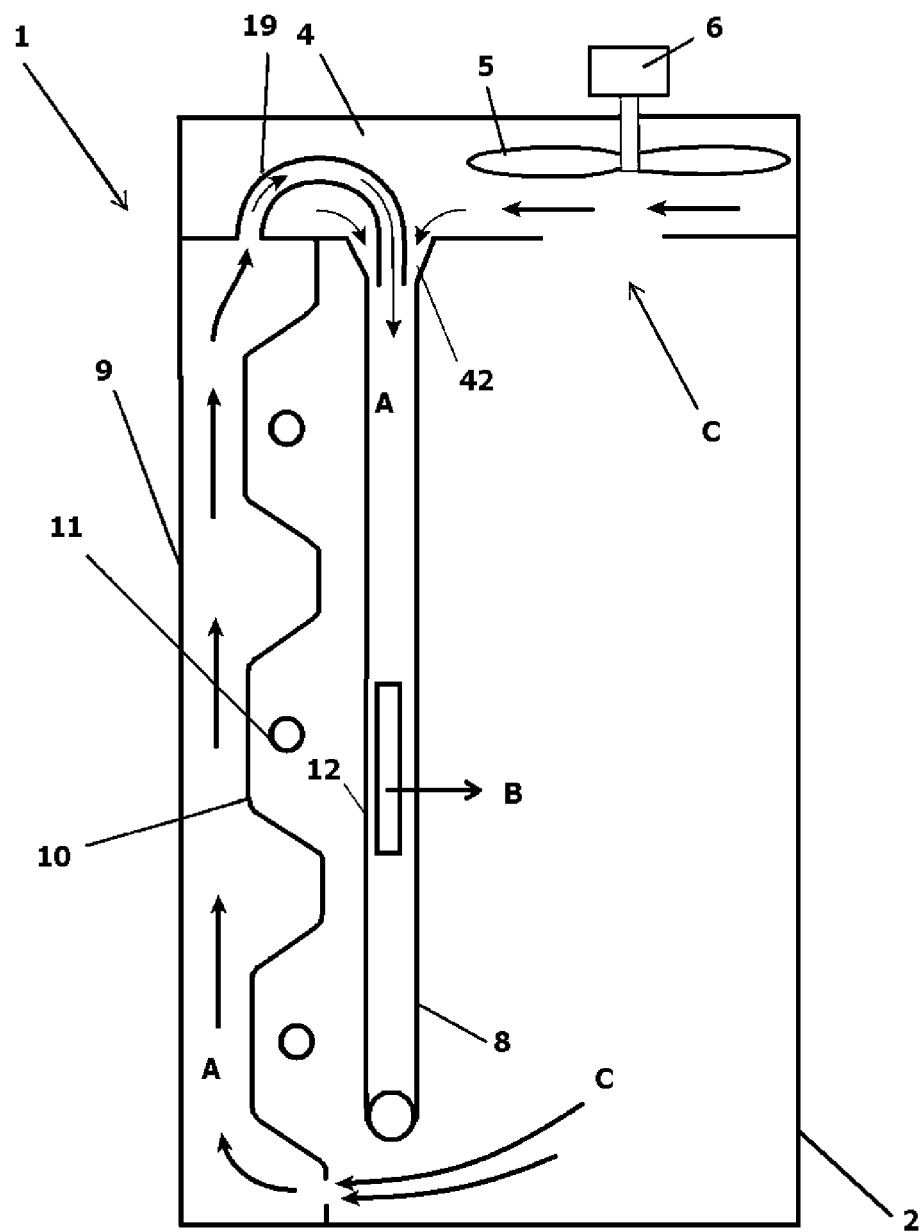
FIG. 11 is a diagrammatic of a cooking apparatus in which is mounted the duct member shown in FIG. 2 showing air flow into an air inlet of the duct member according to the invention.

FIGS. 9 and 10 show the air heating chamber 4 of the present invention. The air heating chamber 4 comprises an impeller fan 5 to draw air from the cooking chamber 2 via the air intake opening 21 of the baffle plate 7 into the air heating chamber 2, and a heating element 26 for heating the intake air. The fan 5 is further operable for circulating and propelling the heated air within and out of the air heating chamber 4 via the air outlet ports 23 of the baffle plate 7 to the duct member 8 and into cooking chamber 2. The air heating chamber 4 further comprises a back plate 27 onto which are mounted the heating element 26 and the impeller fan 5. The plate 27 comprises an upstanding side wall 28 and receiver plate 30 which extends around the chamber 4 to enable the baffle means 7 to be secured to the open face of the air heating chamber 4 such that the impeller fan 5 is positioned substantially opposite the air intake opening 21 of the baffle means 7.

Optionally, an arrangement of guide members 29 may be provided on the plate backing plate 27. The guide members 29 may be integrally formed or releasably interconnected up stands on the backing plate 27 and are positioned between to the impeller fan 5 and the heating element 26. The guide members 29 are provided as curved vanes or fins, and in use, as the airflow directed from the impeller fan 5 passes over the surfaces of the guide members 29 an increase in the speed of the airflow is observed, with a resultant decrease in pressure at exit. The fan guide members fulfil a number of extra functions such as causing areas of differential pressure within the air heating chamber thereby creating a rush of air to the air outlet exit ports 23. Further guide members 31 are provided adjacent to the heating element 26 and opposite each air outlet port 23 of the baffle plate 7. The guide members 31 are provided as a curved vane or plate or fin on the plate 27, and in operation, as the heated airflow passes over the surfaces of the guide members 31 an increase in the speed of the airflow is observed, with a resultant decrease in pressure attracting air from other sections of the heat chamber. A further effect is an increase in the exit airspeed at the air outlet port 23 and has a still further effect of stabilizing the exit airflow entering duct member 8.

The operation of the air delivery and circulation device according to the invention will now be described with specific reference to FIGS. 1, 5 to 8 and FIG. 11.

Heated air, indicated by arrows 'A', is channelled from one or both of the air heating chamber 4 and the air re-circulation chamber 9 and mixed as it passes through a convergent conduit 42 and into the duct member 8. The heated air exits the duct member 8 via the openings 12, indicated by the arrows 'B', passing over the top surface 40 of the aerofoil shaped extension member wings 13b as it flows into the cooking chamber 2.

As the airflow 'B' passes over the aerofoil shaped wing member 13b its speed will increase, with a resultant decrease in pressure. In consequence, heated air within the upper regions of the cooking chamber 2, indicated by the arrows 'C' (FIGS. 6 and 7), which has a higher pressure and temperature relative to the airflow 'B', then moves down toward the region of the chamber 2 comprising lower relative pressure heated air. Cooler air at the sides of the cooking chamber 2 is also drawn around the duct member 8 in the cooking chamber 2 and the associated aerofoil shaped extension member wings 13a, 13b causing a recirculation of air within the cooking chamber 2. It will be understood that the airflow 'C' is moist as it contains moisture that has evaporated from the surface of the food item being cooked and it has not at that stage of the cycle been re-circulated back to the air heating chamber 2 or re-circulation chamber 9 to be dried.

As the airflow 'C' passes over the top surfaces 40 of the aerofoil shaped extension member wings 13a, 13b an increase in the speed of the airflow 'C' is observed, with a resultant decrease in pressure, and the airflows 'B' and 'C' are mixed and directed toward the food item to thereby heat and/or cook the food item. The airflow in the cooking chamber 2 is thus a function of the differential pressure being created by the aerofoil shapes since air flowing over the aerofoil shapes increases in speed with a resultant decrease in pressure.

Air from within the cooking chamber 2 is then drawn back into the heat chamber 4 by the impeller fan 5 and into the re-circulation chamber 9 from the cooking chamber 2 via the inlet 18 at the front of the roof of the cooking chamber 2 and this air is recirculated back to the cooking chamber 2 by repeating the above cycle. The heat from the reflectors 10 is absorbed by the air as it is drawn through the air recirculation chamber 9 and expelled back to the cooking chamber 2 via the openings 12 of the duct member 8 and over the aerofoil shaped extension member 13 to cook or heat food within the cooking chamber 2.

A built in venturi or constriction is provided in the recirculation duct 19 which causes a decrease in pressure thereby drawing air over the reflectors 10 absorbing heat from them and keeping them at a substantially constant temperature in the region of 230 degree Celsius (which is the nominal cavity temperature). Making use of the air recirculation chamber 9 in this manner provides a significant energy saving when the quartz tubes are activated which will avoid the need to power the conventional heating elements of the cooking apparatus 1 during a short cook cycle of about between 30 and 90 seconds.

For example, if heating elements were on they would draw up to about 2000 watts and since the quartz tubes draw about 2000 watts the combined energy draw would be 4000 watts, excluding all the other items such as the motors, fans, magnetrons and the like. Moreover, the provision of the air recirculation chamber 9 which uses the otherwise wasted energy of the quartz reflectors 10 to heat recirculated air from the cooking chamber 2 to cook a product enables the cooking apparatus 1 to be operated using a 13 amp AC supply (2990 watts). The reflectors 10 are also maintained at a constant temperature which improves their overall efficiency and extends their working life. When the cooking apparatus 1 is not cooking and the quartz tubes 11 are powered off, then the oven cooking chamber 2 is maintained at a pre-set temperature, such as 230 degrees Celsius by the heating elements in the air heating chamber 4 cycling on and off.

The present invention thus involves the re-circulation of moist air. The moisture in this recirculated air in the cavity is absorbing stray microwave energy and radiant energy from the quartz tubes and metal of the oven and in the process the moisture which is relatively dry steam is converted into superheated steam by absorbing this stray energy, which otherwise would be lost in the air heating chamber 4, and with a gain of an increase in temperature.

Aspects of the present invention have been described by way of example only and it should be appreciated that additions and/or modifications may be made thereto without departing from the scope thereof as defined in the appended claims.

What is claimed is:

1. An air delivery and circulation device for use within a cooking apparatus that has a cooking chamber that is heated with heated air, said device comprising:
 a duct member mountable within said cooking chamber of said cooking apparatus, said duct member having an airflow inlet for receiving said heated air and at least one opening for channeling said heated air into said cooking chamber, wherein said at least one opening has an elongate top edge and an elongate bottom edge;

a first extension member that projects externally from said duct member into said cooking chamber adjacent said elongate top edge of said at least one opening;
a second extension member that projects externally from said duct member into said cooking chamber adjacent said elongate bottom edge of said at least one opening;
wherein said heated air flows out of said duct member and into said cooking chamber through said at least one opening and between said first extension member and said second extension member,
wherein said heated air flowing between said first extension member and said second extension member causes said heated air to have an increased flow velocity and a decreased pressure as said heated air enters said cooking chamber.

2. The device according to claim 1, wherein said first extension member and said second extension member are comprised of a material capable of withstanding said heated air, wherein said material is selected from a group comprising metal, thermoset polymers, ceramics, and glass.

3. The device according to claim 1, wherein said first extension member has a first top surface and a first bottom surface that are both curved and said second extension member has a second top surface and a second bottom surface that are both curved, therein redirecting said heated air within said cooking chamber as hot air flows between said first extension member and said second extension member.

4. The device according to claim 1, wherein said first extension member and said second extension member are both integrally formed with said duct member.

5. The device according to claim 1, wherein said at least one opening is configured as a plurality of openings, wherein each of said plurality of openings is positioned between said first extension member and said second extension member.

6. The device according to claim 1, wherein the cooking apparatus has a heated air source and said device further includes a connector for connecting said airflow inlet to the heated air source.

7. The device according to claim 1, wherein the cooking apparatus has an air recirculation chamber with an outlet, and said device further includes a connector for connecting said airflow inlet to the outlet of the air recirculation chamber.

8. The device according to claim 1, wherein the cooking apparatus has an air recirculation chamber with an outlet, wherein said device further includes a connector for receiving both said heated air and any air flowing through the outlet of the air recirculation chamber.

9. The device according to claim 1, wherein the cooking apparatus has a baffle for deflecting said heated air, wherein said device further includes mounts for attaching to said baffle.

10. The device according to claim 1, wherein the cooking apparatus has a ceiling surface and said device further includes mounts for attaching said duct member to the ceiling surface.

11. The device according to claim 1, wherein said duct member includes an arrangement of interconnected tube members, wherein said tube members extend into the cooking chamber in a direction of flow through said duct member.

12. The device according to claim 11, wherein said tube members include two parallel tube members.

13. The device according to claim 12, wherein said two parallel tube members are spaced apart by at least one cross tube member that extends substantially perpendicular between said two parallel tube members.

14. The device according to claim 11, wherein said duct member has a length and converging regions along said length.

15. A cooking apparatus comprising:
a cooking chamber for cooking a food product therein;
an air recirculation chamber for recirculating heated air;
a duct member mounted in the cooking chamber, said duct member having an airflow inlet for receiving said heated air from said air recirculation chamber at least one opening for channeling said heated air into said cooking chamber; and
a first extension member that projects externally from said duct member into said cooking chamber adjacent said at least one opening and a second extension member that projects externally from said duct member into said cooking chamber adjacent said at least one opening, wherein said heated air flows between said first extension member and said second extension member and is redirected within said cooking chamber to heat said cooking chamber, wherein said heated air is decreased in pressure as said heated air flows between said first extension member and said second extension member.

16. A cooking apparatus comprising:
a cooking chamber for cooking a food product therein;
an air heating chamber for producing heated air;
an air recirculation chamber for recirculating said heated air;
a duct member mounted in said cooking chamber, said duct member having at least one opening into said cooking chamber and an airflow inlet for receiving said heated air from both of said air heating chamber and said air recirculation chamber, wherein said duct member channels said heated air from said air heating chamber and said air recirculation chamber from said airflow inlet to said at least one opening, and
a first extension member that projects externally into said cooking chamber from said duct member at said at least one opening and a second extension member that projects into said cooking chamber externally from said duct member into said cooking chamber adjacent said at least one opening, wherein said heated air flows between said first extension member and said second extension member and is redirected within said cooking chamber to heat said cooking chamber, wherein said heated air is decreased in pressure as said heated air flows between said first extension member and said second extension member.

* * * * *